United States Patent
Desai

(10) Patent No.: US 7,777,611 B2
(45) Date of Patent: Aug. 17, 2010

(54) DISPLAY DEVICE FOR EXTERIOR REARVIEW MIRROR

(75) Inventor: Deval M. Desai, Farmington Hills, MI (US)

(73) Assignee: Donnelly Corporation, Holland, MI (US)

( * ) Notice: Subject to any disclaimer, the term of this patent is extended or adjusted under 35 U.S.C. 154(b) by 413 days.

(21) Appl. No.: 11/933,697

(22) Filed: Nov. 1, 2007

(65) Prior Publication Data

US 2008/0106389 A1 May 8, 2008

Related U.S. Application Data

(60) Provisional application No. 60/857,025, filed on Nov. 6, 2006.

(51) Int. Cl.
*B60Q 1/00* (2006.01)

(52) U.S. Cl. .................... 340/425.5; 340/475; 340/436; 362/135; 362/492

(58) Field of Classification Search ............. 340/425.5, 340/475, 436, 903; 362/494, 487, 135, 540, 362/511
See application file for complete search history.

(56) References Cited

U.S. PATENT DOCUMENTS

| | | |
|---|---|---|
| 2,010,138 A | 8/1935 | Condon |
| 2,263,382 A | 11/1941 | Gotzinger |
| 2,580,014 A | 12/1951 | Gazda |
| 3,266,016 A | 8/1966 | Maruyama et al. |
| 4,499,451 A | 2/1985 | Suzuki et al. |
| 4,588,267 A | 5/1986 | Pastore |
| 4,623,222 A | 11/1986 | Itoh et al. |
| 4,630,904 A | 12/1986 | Pastore |
| 4,721,364 A | 1/1988 | Itoh et al. |
| 4,793,690 A | 12/1988 | Gahan et al. |
| 4,799,768 A | 1/1989 | Gahan |
| 4,906,085 A | 3/1990 | Sugihara et al. |
| 4,917,477 A | 4/1990 | Bechtel et al. |
| 4,951,179 A | 8/1990 | Machida |
| 5,014,167 A | 5/1991 | Roberts |
| 5,189,537 A | 2/1993 | O'Farrell |
| 5,207,492 A | 5/1993 | Roberts |
| 5,313,335 A | 5/1994 | Gray et al. |
| 5,340,503 A | 8/1994 | Varaprasad et al. |
| 5,355,284 A | 10/1994 | Roberts |
| 5,371,659 A | 12/1994 | Pastrick et al. |
| 5,436,741 A | 7/1995 | Crandall |
| 5,438,487 A | 8/1995 | Schmid et al. |

(Continued)

FOREIGN PATENT DOCUMENTS

CA 1063695 10/1979

(Continued)

*Primary Examiner*—Toan N Pham
(74) *Attorney, Agent, or Firm*—Van Dyke, Gardner, Linn & Burkhart, LLP

(57) ABSTRACT

A mirror reflective element sub-assembly for an exterior rearview mirror assembly of a vehicle includes a mirror reflective element and a video display element. The video display element is disposed behind the mirror reflective element so that images displayed by the video display element are viewable through the mirror reflective element when the video display element is activated. The video display element is configured to display images that are readily viewable by the driver of the host vehicle and not readily viewable by drivers of other vehicles in the lane adjacent to the host vehicle.

15 Claims, 3 Drawing Sheets

U.S. PATENT DOCUMENTS

| | | | |
|---|---|---|---|
| 5,481,409 | A | 1/1996 | Roberts |
| 5,497,306 | A | 3/1996 | Pastrick |
| 5,528,422 | A | 6/1996 | Roberts |
| 5,535,056 | A | 7/1996 | Caskey et al. |
| 5,575,552 | A | 11/1996 | Faloon et al. |
| 5,587,699 | A * | 12/1996 | Faloon et al. ............... 340/475 |
| 5,669,699 | A | 9/1997 | Pastrick et al. |
| 5,724,187 | A | 3/1998 | Varaprasad et al. |
| 5,751,489 | A | 5/1998 | Caskey et al. |
| 5,774,283 | A * | 6/1998 | Nagel et al. ................. 359/838 |
| 5,786,772 | A | 7/1998 | Schofield et al. |
| 5,788,357 | A | 8/1998 | Muth et al. |
| 5,823,654 | A | 10/1998 | Pastrick et al. |
| 5,929,786 | A | 7/1999 | Schofield et al. |
| 5,938,320 | A | 8/1999 | Crandall |
| 6,005,724 | A | 12/1999 | Todd |
| 6,045,243 | A | 4/2000 | Muth et al. |
| 6,065,840 | A | 5/2000 | Caskey et al. |
| 6,076,948 | A * | 6/2000 | Bukosky et al. ............. 362/494 |
| 6,111,683 | A | 8/2000 | Cammenga et al. |
| 6,175,300 | B1 | 1/2001 | Kendrick |
| 6,176,602 | B1 | 1/2001 | Pastrick et al. |
| 6,196,688 | B1 | 3/2001 | Caskey et al. |
| 6,198,409 | B1 | 3/2001 | Schofield et al. |
| 6,227,689 | B1 | 5/2001 | Miller |
| 6,243,218 | B1 | 6/2001 | Whitehead |
| 6,257,746 | B1 | 7/2001 | Todd et al. |
| 6,276,821 | B1 | 8/2001 | Pastrick et al. |
| 6,286,965 | B1 | 9/2001 | Caskey et al. |
| 6,310,738 | B1 | 10/2001 | Chu |
| 6,356,376 | B1 | 3/2002 | Tonar et al. |
| 6,447,130 | B2 | 9/2002 | Chu |
| 6,467,920 | B2 | 10/2002 | Schnell et al. |
| 6,512,624 | B2 | 1/2003 | Tonar et al. |
| 6,582,109 | B2 | 6/2003 | Miller |
| 6,598,982 | B2 | 7/2003 | Witt |
| 6,612,708 | B2 | 9/2003 | Chu |
| 6,616,314 | B2 | 9/2003 | Thau |
| 6,669,267 | B1 | 12/2003 | Lynam et al. |
| 6,690,268 | B2 | 2/2004 | Schofield et al. |
| 6,700,692 | B2 | 3/2004 | Tonar et al. |
| 6,755,544 | B2 | 6/2004 | Schnell et al. |
| 6,855,431 | B2 | 2/2005 | Varaprasad et al. |
| 6,882,287 | B2 | 4/2005 | Schofield |
| 6,902,284 | B2 | 6/2005 | Hutzel et al. |
| 7,038,577 | B2 | 5/2006 | Pawlicki et al. |
| 7,083,312 | B2 * | 8/2006 | Pastrick et al. ............. 362/494 |
| 7,184,190 | B2 | 2/2007 | McCabe et al. |
| 7,195,381 | B2 | 3/2007 | Lynam et al. |
| 7,241,037 | B2 * | 7/2007 | Mathieu et al. ............. 362/494 |
| 7,255,451 | B2 | 8/2007 | McCabe et al. |
| 7,404,654 | B2 * | 7/2008 | Lueftner .................... 362/494 |
| 7,581,859 | B2 * | 9/2009 | Lynam ...................... 362/494 |
| 2006/0061008 | A1 | 3/2006 | Karner et al. |
| 2006/0181772 | A1 | 8/2006 | Byers et al. |
| 2006/0184297 | A1 | 8/2006 | Higgins-Luthman |
| 2007/0058257 | A1 | 3/2007 | Lynam |

FOREIGN PATENT DOCUMENTS

| | | |
|---|---|---|
| GB | 1172382 | 11/1969 |
| WO | WO-2006/017019 | 2/2006 |
| WO | WO-2006/124682 | 11/2006 |
| WO | WO-2007/005942 | 1/2007 |

* cited by examiner

DISPLAY DEVICE FOR EXTERIOR REARVIEW MIRROR

CROSS REFERENCE TO RELATED APPLICATION

The present application claims benefit of U.S. provisional application Ser. No. 60/857,025, filed Nov. 6, 2006, which is hereby incorporated herein by reference in its entirety.

FIELD OF THE INVENTION

The present invention relates to exterior rearview mirror assemblies and, more particularly, to an exterior rearview mirror assembly having a turn signal indicator or a blind spot/object detection indicator and/or a lane change aid (LCA) indicator or other indicator at the exterior rearview mirror assembly.

BACKGROUND OF THE INVENTION

It is known to provide an object in a blind spot detection/LCA system for a vehicle that detects the presence of another vehicle or object in the lane next to the host vehicle, where it may be difficult for the driver of the host vehicle to determine whether or not there is another vehicle or object adjacent to the host vehicle. Such an object in a blind spot detection/LCA system often includes a visual indicator that visually indicates the detection of another vehicle or object to the driver of the host vehicle.

Typically, the object/LCA visual indicator or indicators indicate or alert the driver of the host vehicle of the presence or impending presence of another vehicle or object in a blind spot in an adjacent side lane that typically cannot be readily seen within the field of view of the exterior mirror reflective element of the exterior mirror assembly mounted at that side of the vehicle and/or cannot be readily seen by the driver's peripheral vision or the like. The object/LCA visual indicators typically are arranged to be viewable principally or solely by the driver of the host vehicle and not by drivers of other vehicles.

A variety of interior and exterior mirror assemblies with indicators are known in the art, such as U.S. Pat. Nos. 6,250,783; 5,669,705; 5,823,116; 6,296,379; 6,832,848; 5,943,176; 6,099,153; 5,355,284; 5,788,357; 6,257,746; 6,005,724; 5,481,409; 6,111,683; 6,045,243; 6,512,624; 6,356,376; 2,263,382; 2,580,014; 3,266,016; 4,499,451; 4,588,267; 4,630,904; 4,623,222; 4,721,364; 4,906,085; 5,313,335; 5,587,699; 5,575,552; 5,436,741; 5,587,699; 5,938,320; 6,700,692; and 5,786,772, and Canadian Pat. No. CA 1,063,695, and Great Britain Patent Specification 1,172,382 and Pat. Abstracts of Japan Publication No. 0917573, published Jul. 8, 1997, and PCT Publication WO 95/30495, published Nov. 16, 1995, which are all hereby incorporated herein by reference in their entireties.

Therefore, there is a need in the art for an improved object in a blind spot/LCA indicator that is readily viewable by a driver of the host vehicle and not visible or viewable by a driver of another vehicle.

SUMMARY OF THE INVENTION

The present invention provides an object in a blind spot indicator or lane change assist (LCA) indicator that provides a video image of the blind spot area at the reflective element of the exterior rearview mirror so that the driver may readily view the blind spot area via the exterior rearview mirror. The video image may be provided at a portion of the reflective element of the exterior rearview mirror and may be activated in response to a detection of an object at the blind spot area of the host vehicle.

According to an aspect of the present invention, an exterior rearview mirror assembly for a vehicle includes a mirror reflective element, a mirror reflective element sub-assembly for an exterior rearview mirror assembly of a vehicle includes a mirror reflective element and a video display element disposed behind the mirror reflective element so that images displayed by the video display element are viewable through the mirror reflective element when the video display element is activated. The video display element is configured to display images that are readily viewable by the driver of the host vehicle and not readily viewable by drivers of other vehicles in the lane adjacent to the host vehicle. Optionally, the video display element may be operable to display other images that are readily viewable by drivers of other vehicles in the lane adjacent to the host vehicle and not readily viewable by the driver of the host vehicle.

These and other objects, advantages, purposes and features of the present invention will become apparent upon review of the following specification in conjunction with the drawings.

DESCRIPTION OF THE PREFERRED EMBODIMENTS

Figure 1:
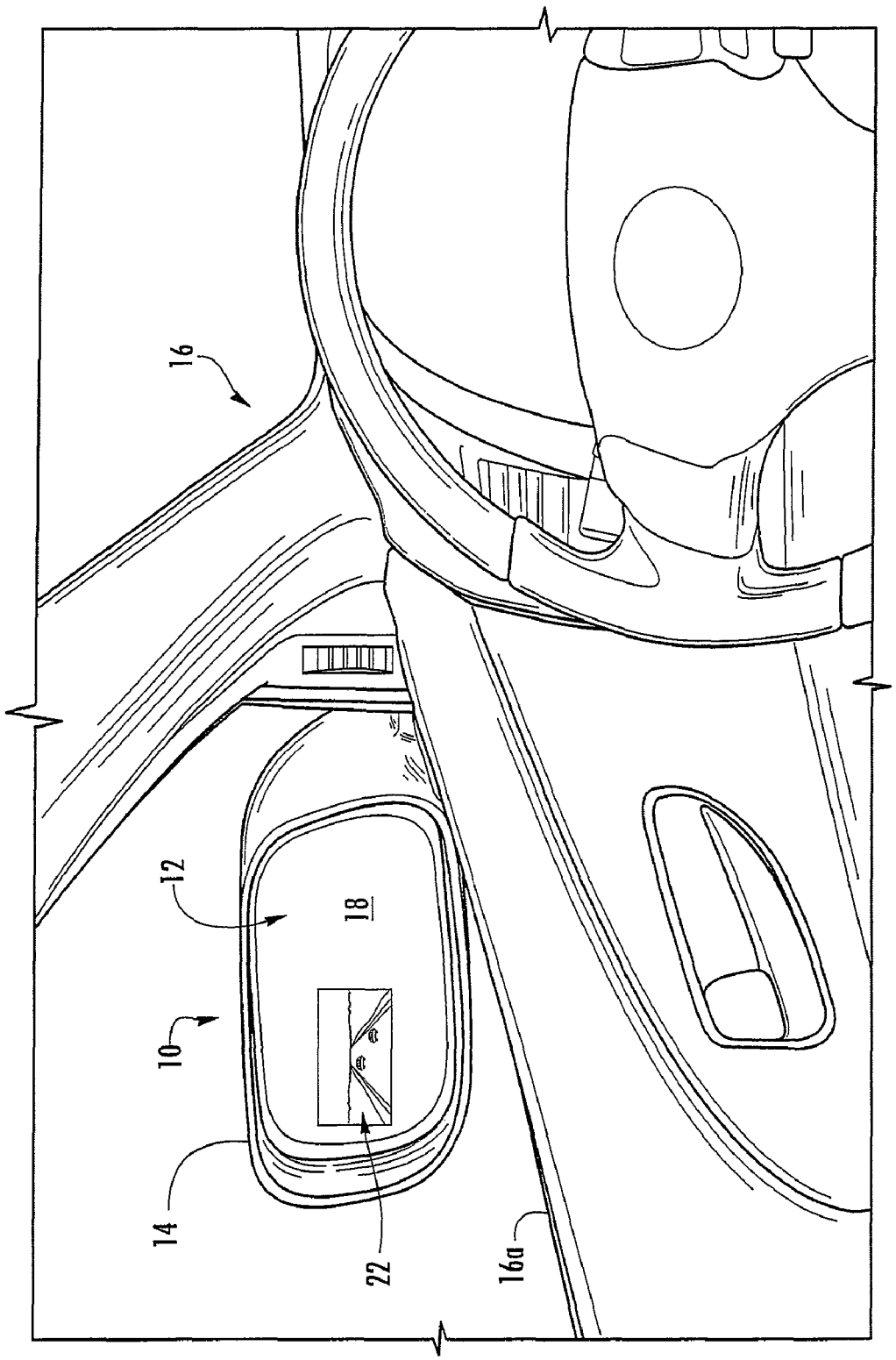
FIG. 1 is a view of an exterior mirror assembly with a display device in accordance with the present invention, shown as viewed in the direction of travel of the vehicle.

Referring now to the drawings and the illustrative embodiments depicted therein, an exterior rearview mirror assembly 10 for a vehicle includes a mirror reflector sub-assembly 12 and a mirror shell or casing 14 (FIG. 1). Mirror assembly 10 is mounted at the side 16a of a host or subject vehicle 16. Mirror assembly 10 includes a display element or device 22 that is disposed behind reflective element 18 and that is operable to provide a display or indication at the reflective element for viewing the display or indication through the mirror reflective element. The display device 22 comprises a video display device or module that may be actuatable in response to a blind spot detection/lane change assist system detecting an object at the side of the vehicle and in the area that is typically referred to as the "blind spot", so that the driver is able to view the images of the blind spot to see what was detected by the blind spot detection system, as discussed below.

Display device or module 22 comprises a video display that is operable to display images of the blind spot area at the side or rear of the vehicle as captured by one or more cameras or image sensors of the vehicle. The display device may comprise any suitable video display device, and may utilize aspects of the video display devices or modules described in U.S. Pat. No. 6,690,268; and/or PCT Application No. PCT/US06/042718, filed Oct. 31, 2006 by Donnelly Corp. et al. for INTERIOR REARVIEW MIRROR WITH DISPLAY; and/or PCT Application No. PCT/US03/40611, filed Dec. 19, 2003 by Donnelly Corp. et al. for ACCESSORY SYSTEM FOR VEHICLE, and/or U.S. patent applications Ser. No. 11/284,543, filed Nov. 22, 2005 and published Jul. 27, 2006 as U.S. Publication No. US-2006-164230-A1, now U.S. Pat. No. 7,370,983; and/or Ser. No. 10/538,724, filed Jun. 13, 2005 and published Mar. 9, 2006 as U.S. Publication No. US-2006-0050018-A1, and/or U.S. provisional applications Ser. No. 60/630,061, filed Nov. 22, 2004 by Lynam et al. for MIRROR ASSEMBLY WITH VIDEO DISPLAY; and Ser. No. 60/667,048, filed Mar. 31, 2005 by Lynam et al. for MIRROR ASSEMBLY WITH VIDEO DISPLAY, which are hereby incorporated herein by reference in their entireties.

Optionally, and preferably, display device 22 comprises a dual display device that is operable to display one image (or video image) for viewing by a person viewing the display device from one angle and another image (or video image) for viewing by a person viewing the display device from another angle (such as described in U.S. patent application Ser. No. 11/861,904, filed Sep. 26, 2007, and U.S. provisional applications Ser. No. 60/896,134, filed Mar. 21, 2007; Ser. No. 60/902,280, filed Feb. 20, 2007; Ser. No. 60/901,514, filed Feb. 13, 2007; Ser. No. 60/900,282, filed Feb. 8, 2007; Ser. No. 60/879,619, filed Jan. 10, 2007; Ser. No. 60/850,700, filed Oct. 10, 2006; and Ser. No. 60/847,502, filed Sep. 27, 2006, which are hereby incorporated herein by reference in their entireties). For example, the display device 22 may display images of the blind spot area in a direction generally toward the vehicle for viewing by the driver of the host vehicle, while being substantially not viewable by drivers of other vehicles at the side and/or rear of the host vehicle. The display device 22 may display other images for viewing by drivers of other vehicles, such as a turn signal indication or other alert that may be viewable by drivers of other vehicles at the side or rear of the host vehicle, while being substantially non-viewable by the driver of the host vehicle. The reflective element of the rearview mirror is preferably a transflective reflective element that is partially transmitting of light therethrough while being partially or substantially of light incident thereon, such as described below. Thus, the transflective reflective element allows the video display to be viewable through the reflective element yet provides a mirror function and is viewed as a reflecting mirror reflective element when the display is deactivated.

The mirror-located single video screen thus may preferably comprise a multi-viewing video screen, such as a dual-viewing screen or such as a Triple Directional Viewing LCD Screen, such as are available from Sharp Corporation and Sharp Laboratories of Europe, Ltd., who have developed a Triple Directional Viewing LCD that comprises a display that controls the viewing angle so that the display can show different images from the left, right, and center simultaneously. Preferably, a two-way viewing-angle LCD screen with switchable viewing-angle LCD construction can be used at the exterior rearview mirror. Such Directional Viewing LCD screens from Sharp control the viewing-angle via a parallax barrier on a standard thin film transistor liquid crystal display (TFT LCD) video display element, whereby the screen splits light in two or three directions (such as left, right, and center) and displays two or three separate images on the same screen (and preferably over substantially the entire or full screen) at the same time. For example, the driver can view the exterior mirror-located video screen for a blind spot alert or video image of the blind spot area when an object or vehicle is detected at the blind spot area, while an occupant or driver of another vehicle in an adjacent lane views a different image, such as a turn signal indicator or the like.

The video display device or screen thus may be embedded in the exterior mirror assembly (such as behind the reflective element of the exterior mirror assembly, and may be part of or attached to the back plate of mirror assembly, and may be encased within the exterior mirror casing) to provide a lane change assist function by displaying images of the blind spot or zone scene, and preferably only when the presence of a vehicle is detected in the adjacent lane, and/or when the turn signal switch is activated. During normal driving conditions, the video display or screen would turn off and the mirror would return back to a normal appearance of a reflective element. Optionally, and desirably, the video display or screen may utilize dual screen technology, whereby only the driver sees the blind zone scene. Thus, the drivers of vehicles in lane adjacent to the host vehicle will see a normal mirror, and an optional turn signal when equipped.

Figure 2:
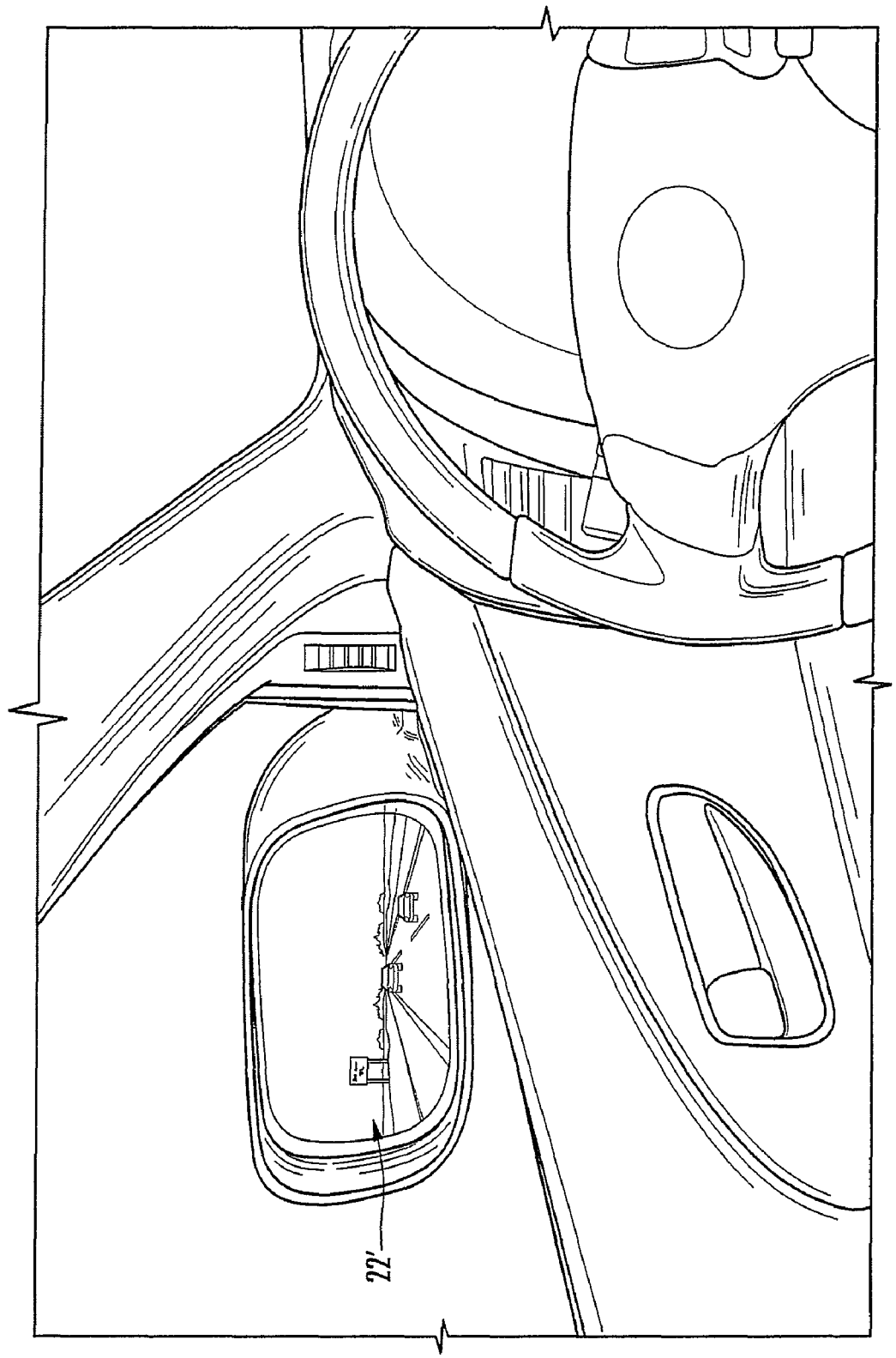
FIG. 2 is a view of another exterior mirror assembly with another display device in accordance with the present invention, shown as viewed in the direction of travel of the vehicle.

Optionally, and as shown in FIG. 1, the video display device or module or screen 22 may provide the display at a display portion or area of the reflective element, such as at an outer or outboard region (away from the vehicle) of the reflective element. Optionally, however, and as shown in FIG. 2, the video display device or module or screen may provide the display 22' at the full area (or substantially the full area) of the mirror reflective element.

The video display device of the present invention may be configured so that the images displayed are viewable by a person viewing the reflective element from a particular direction (such as described in U.S. patent application Ser. No. 11/861,904, filed Sep. 26, 2007, and U.S. provisional applications Ser. No. 60/896,134, filed Mar. 21, 2007; Ser. No. 60/902,280, filed Feb. 20, 2007; Ser. No. 60/901,514, filed Feb. 13, 2007; Ser. No. 60/900,282, filed Feb. 8, 2007; Ser. No. 60/879,619, filed Jan. 10, 2007; Ser. No. 60/850,700, filed Oct. 10, 2006; and Ser. No. 60/847,502, filed Sep. 27, 2006, which are hereby incorporated herein by reference in their entireties), or the reflective element sub-assembly may incorporate light directing means to direct the images in the desired direction, or may incorporate baffles or the like to limit or substantially preclude viewing of the images from a direction other than the desired or appropriate direction. Such reflective element sub-assemblies may utilize aspects of the reflective element sub-assemblies described in U.S. patent application Ser. No. 11/520,193, filed Sep. 13, 2006, now U.S. Pat. No. 7,581,859; and/or PCT Application No. PCT/US2006/018567, filed May 16, 2006 by Donnelly Corp. et al. for VEHICLE MIRROR ASSEMBLY WITH INDICIA AT REFLECTIVE ELEMENT; and/or PCT Application No. PCT/US2006/026148, filed Jul. 5, 2006; and/or PCT Application No. PCT/US07/82099, filed Oct. 23, 2007, which are hereby incorporated herein by reference in their entireties.

The video display device or module is operable to display video images as captured by one or more cameras or image sensors at the vehicles. For example, an image sensor may be mounted at the vehicle, and have a rearward and/or sideward field of view directed toward the typical blind spot at the side of the vehicle (such as at the driver side of the vehicle for a display device at the driver side exterior mirror or at the passenger side of the vehicle for a display device at the passenger side exterior mirror). The image sensor or sensors may have a sideward and/or rearward and/or forward field of view for capturing images of a scene occurring at the side region of the vehicle or rearward of the vehicle or forward of the vehicle (and optionally immediately rearward or sideward or forward of the vehicle). Because the images of a sideward blind spot region may be displayed at the exterior side rearview mirror at the respective side of the vehicle, the display device and image display of the present invention provides a cognizant association between the displayed image and the respective side region at which the scene represented by the captured images is occurring. Optionally, the display device of the present invention may also be used in conjunction with an imaging sensor or camera that has a generally downward field of view so that the person viewing the display at the exterior mirror may view video images that are representative of the area immediately adjacent the front, side or rear of the vehicle. Because the exterior mirror assembly and video display is located at the left or right side of the vehicle, the person viewing the displayed images can readily associate at which side of the vehicle the scene being captured by the camera/cameras is occurring.

The image sensor may comprise any suitable type of image sensor, such as an imaging array sensor having a plurality of pixels or photo sensors, such as a CCD sensor or a CMOS image sensor or the like, and/or may utilize aspects of the image sensors and/or vision systems described in U.S. Pat. Nos. 5,550,677; 5,670,935; 5,796,094; 6,396,397; and 6,097,023, and U.S. patent applications Ser. No. 09/441,341, filed Nov. 16, 1999 by Schofield et al. for VEHICLE HEADLIGHT CONTROL USING IMAGING SENSOR, now U.S. Pat. No. 7,339,149, filed May 11, 2005 by Bingle et al. for IMAGING SYSTEM FOR VEHICLE; and/or Ser. No. 11/201,661, filed Aug. 11, 2005 and published Feb. 23, 2006 as U.S. Publication No. US-2006-0038668-A1; and/or PCT Application No. PCT/US2006/041709, filed Oct. 27, 2006 by Donnelly Corp. for CAMERA MODULE FOR VEHICLE VISION SYSTEM, which are all hereby incorporated herein by reference in their entireties. Optionally, the image sensor or sensors may be operable utilizing the principles of such other vehicular vision or detection systems, such as a vehicle headlamp control system, such as the type disclosed in U.S. Pat. Nos. 5,796,094; 6,097,023; 6,320,176; 6,559,435; 6,831,261; and 7,004,606, and U.S. patent applications Ser. No. 09/441,341, filed Nov. 16, 1999 by Schofield et al. for VEHICLE HEADLIGHT CONTROL USING IMAGING SENSOR, now U.S. Pat. No. 7,339,149, filed Apr. 14, 2005 by Schofield et al. for IMAGING SYSTEM FOR VEHICLE, now U.S. Pat. No. 7,526,103, which are all hereby incorporated herein by reference in their entireties, a rain sensor, such as the types disclosed in commonly assigned U.S. Pat. Nos. 6,353,392; 6,313,454; and/or 6,320,176, and/or U.S. patent application Ser. No. 11/201,661, filed Aug. 11, 2005 and published Feb. 23, 2006 as U.S. Publication No. US-2006-0038668-A1, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; and 6,946,978, and/or in U.S. patent application Ser. No. 10/643,602, filed Aug. 19, 2003 by Schofield et al. for VISION SYSTEM FOR A VEHICLE INCLUDING IMAGING PROCESSOR, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,038,577; 5,929,786; and/or 5,786,772, and/or U.S. patent applications Ser. No. 11/408,776, filed Apr. 21, 2006 and published Sep. 14, 2006 as U.S. Publication No. US-2006-0206243-A1; Ser. No. 11/239,980, filed Sep. 30, 2005; and/or Ser. No. 11/315,675, filed Dec. 22, 2005, and/or U.S. provisional applications Ser. No. 60/628,709, filed Nov. 17, 2004 by Camilleri et al. for IMAGING AND DISPLAY SYSTEM FOR VEHICLE; Ser. No. 60/614,644, filed Sep. 30, 2004; Ser. No. 60/618,686, filed Oct. 14, 2004 by Laubinger for VEHICLE IMAGING SYSTEM; Ser. No. 60/638,687, filed Dec. 23, 2004 by Higgins-Luthman for OBJECT DETECTION SYSTEM FOR VEHICLE, which are hereby incorporated herein by reference in their entireties, a video device for internal cabin surveillance and/or video telephone function, such as disclosed in U.S. Pat. Nos. 5,760,962; 5,877,897; and/or 6,690,268; and/or PCT Application No. PCT/US03/40611, filed Dec. 19, 2003 by Donnelly Corp. et al. for ACCESSORY SYSTEM FOR VEHICLE, and/or U.S. patent applications Ser. No. 11/284,543, filed Nov. 22, 2005 and published Jul. 27, 2006 as U.S. Publication No. US-2006-164230-A1, now U.S. Pat. No. 7,370,983; and/or Ser. No. 10/538,724, filed Jun. 13, 2005 and published Mar. 9, 2006 as U.S. Publication No. US-2006-0050018-A1, and/or U.S. provisional applications Ser. No. 60/630,061, filed Nov. 22, 2004 by Lynam et al. for MIRROR ASSEMBLY WITH VIDEO DISPLAY; and Ser. No. 60/667,048, filed Mar. 31, 2005 by Lynam et al. for MIRROR ASSEMBLY WITH VIDEO DISPLAY, which are hereby incorporated herein by reference in their entireties, a traffic sign recognition system, a system for determining a distance to a leading or trailing vehicle or object, such as a system utilizing the principles disclosed in U.S. Pat. No. 6,396,397 and/or U.S. patent application Ser. No. 10/422,512, filed Apr. 24, 2003 by Schofield for DRIVING SEPARATION DISTANCE INDICATOR, now U.S. Pat. No. 7,123,168, which are hereby incorporated herein by reference in their entireties, and/or the like.

Such a display may function as a lane change assist (LCA) display or indicator and/or a blind spot display or indicator. Such blind spot indicators are typically activated when an object is detected (via a side object or blind spot detection system or the like such as described in U.S. Pat. Nos. 7,038,577; 6,882,287; 6,198,409; 5,929,786; and 5,786,772, and/or U.S. patent application Ser. No. 11/315,675, filed Dec. 22, 2005 by Higgins-Luthman for OBJECT DETECTION SYSTEM FOR VEHICLE; and/or PCT Application No. PCT/US2006/026148, filed Jul. 5, 2006 by Donnelly Corp. et al. for VEHICLE EXTERIOR MIRROR ASSEMBLY WITH BLIND SPOT INDICATOR, which are hereby incorporated herein by reference in their entireties) at the side and/or rear of the vehicle (at the blind spot) and when the turn signal is also activated, so as to provide an alert to the driver of the host vehicle that there is an object or vehicle in the lane next to the host vehicle at a time when the driver of the host vehicle intends to move over into the adjacent lane. Optionally, and alternately, the display may function as a lane change assist display or indicator, where the host vehicle may be detected to be moving into an adjacent lane without the turn signal being activated, and an object or vehicle may be detected at the adjacent lane, whereby the LCA display or indicator may be activated to provide an alert to the driver of the lane change to assist the driver in avoiding unintentional lane changes and/or lane changes when a vehicle or object is detected in the adjacent lane, such as described above.

The video display device or module of the present invention thus is operable to provide an indication to the driver of the host vehicle that an object or other vehicle has been detected in the lane or area adjacent to the side of the host vehicle. The video display device may be operable in association with a vision system or imaging system or detection system, which may include an imaging sensor or sensors, or an ultrasonic sensor or sensors, or a sonar sensor or sensors or the like. Optionally, the imaging sensor or camera (which may capture the video images for displaying at the video display device or module) may also be used in conjunction with a radar side object detection system (or other non-imaging detection system, such as ultrasonic sensors or sonar sensors or the like), whereby a detection of an object by the non-imaging detection system may cause the camera to activate for capturing images to be displayed by the video display device or module. For example, the detection system may utilize aspects of the vision and/or detection and/or imaging systems described in U.S. Pat. Nos. 7,038,577; 6,882,287; 6,198,409; 5,929,786; and/or 5,786,772, and/or U.S. patent applications Ser. No. 11/239,980, filed Sep. 30, 2005 by Camilleri et al. for VISION SYSTEM FOR VEHICLE; and/or Ser. No. 11/315,675, filed Dec. 22, 2005 by Higgins-Luthman for OBJECT DETECTION SYSTEM FOR VEHICLE, and/or U.S. provisional applications Ser. No. 60/638,687, filed Dec. 23, 2004 by Higgins-Luthman for OBJECT DETECTION SYSTEM FOR VEHICLE; Ser. No. 60/628,709, filed Nov. 17, 2004 by Camilleri et al. for IMAGING AND DISPLAY SYSTEM FOR VEHICLE; Ser. No. 60/614,644, filed Sep. 30, 2004; and/or Ser. No. 60/618,686, filed Oct. 14, 2004 by Laubinger for VEHICLE IMAGING SYSTEM, and/or of the reverse or backup aid systems, such as the rearwardly directed vehicle vision systems described in U.S. Pat. Nos. 5,550,677; 5,760,962; 5,670,935; 6,201,642; 6,396,397; 6,498,620; 6,717,610 and/or 6,757,109, and/or U.S. patent application Ser. No. 10/418,486, filed Apr. 18, 2003 by McMahon et al. for VEHICLE IMAGING SYSTEM, now U.S. Pat. No. 7,005,974, and/or of the automatic headlamp controls described in U.S. Pat. Nos. 5,796,094 and/or 5,715,093; and/or U.S. patent application Ser. No. 11/105,757, filed Apr. 14, 2005 by Schofield et al. for IMAGING SYSTEM FOR VEHICLE, now U.S. Pat. No. 7,526,103; and/or U.S. provisional application Ser. No. 60/607,963, filed Sep. 8, 2004 by Schofield for IMAGING SYSTEM FOR VEHICLE, and/or of the rain sensors described in U.S. Pat. Nos. 6,250,148 and 6,341,523, and/or of other imaging systems, such as the types described in U.S. Pat. Nos. 6,353,392 and 6,313,454, which may utilize various imaging sensors or imaging array sensors or cameras or the like, such as a CMOS imaging array sensor, a CCD sensor or other sensors or the like, such as the types disclosed in commonly assigned, U.S. Pat. Nos. 5,550,677; 5,760,962; 6,097,023 and 5,796,094, and U.S. patent application Ser. No. 09/441,341, filed Nov. 16, 1999 by Schofield et al. for VEHICLE HEADLIGHT CONTROL USING IMAGING SENSOR, now U.S. Pat. No. 7,339,149, and/or PCT Application No. PCT/US2003/036177 filed Nov. 14, 2003, published Jun. 3, 2004 as PCT Publication No. WO 2004/047421 A3, with all of the above referenced U.S. patents, patent applications and provisional applications and PCT applications being commonly assigned and being hereby incorporated herein by reference in their entireties.

Optionally, the display or indicator of the present invention may alert the driver of the host vehicle of other situations or status or the like. For example, the display could function to alert the driver of the host vehicle that the brake lights of the host vehicle are functioning properly. Other applications or uses of the display may be implemented, without affecting the scope of the present invention. Optionally, for example, the display device or module may display video images or may display other alerts or icons, such as, for example, a multistage indicator having multiple indicating portions or elements or devices for indicating a degree of hazard or the like of an object or vehicle detected alongside and/or rearward of the host vehicle (such as an indicating display of the types described in PCT Application No. PCT/US2006/026148, filed Jul. 5, 2006; and U.S. provisional applications Ser. No. 60/696,953, filed Jul. 6, 2005 by Lynam for VEHICLE EXTERIOR MIRROR ASSEMBLY WITH BLIND SPOT INDICATOR, and Ser. No. 60/784,570, filed Mar. 22, 2006, which are hereby incorporated herein by reference in their entireties), or other types of indicating means, such as by utilizing aspects of the displays or indicators described in U.S. Pat. No. 6,598,982, issued to Witt; U.S. patent application Ser. No. 11/226,628, filed Sep. 14, 2005; and/or PCT Application No. PCT/US2006/018567, filed May 15, 2006, which are hereby incorporated herein by reference in their entireties, without affecting the scope of the present invention.

Preferably, the mirror reflective element comprises a transflective display on demand reflective element that is partially transmissive and partially reflective, so that the light emanating from the video display device or module may be transmitted through the reflective element when the video display device or illumination source is activated, but the indicator and light baffle is substantially non-visible or viewable when the video display device or illumination source is deactivated. For example, the reflective element of the rearview mirror assembly may comprise an electro-optic or electrochromic reflective element or cell, such as an electrochromic mirror assembly and electrochromic reflective element utilizing principles disclosed in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407; and/or 4,712,879, and/or U.S. patent applications Ser. No. 10/054,633, filed Jan. 22, 2002 by Lynam et al. for VEHICULAR LIGHTING SYSTEM, now U.S. Pat. No. 7,195,381; Ser. No. 11/021,065, filed Dec. 23, 2004, now U.S. Pat. No. 7,255,451; and/or Ser. No. 11/226,628, filed Sep. 14, 2005 by Kamer et al. for MOUNTING ASSEMBLY FOR VEHICLE INTERIOR MIRROR, and/or U.S. provisional applications Ser. No. 60/695,149, filed Jun. 29, 2005; Ser. No. 60/690,400, filed Jun. 14, 2005; Ser. No. 60/681,250, filed May 16, 2005; and/or Ser. No. 60/692,113, filed Jun. 20, 2005; and/or PCT Application No. PCT/US2006/018567, filed May 15, 2006, which are all hereby incorporated herein by reference in their entireties, and/or as disclosed in the following publications: N. R. Lynam, "Electrochromic Automotive Day/Night Mirrors", *SAE Technical Paper Series* 870636 (1987); N. R. Lynam, "Smart Windows for Automobiles", *SAE Technical Paper Series* 900419 (1990); N. R. Lynam and A. Agrawal, "Automotive Applications of Chromogenic Materials", *Large Area Chrornogenics: Materials and Devices for Transmittance Control*, C. M. Lampert and C. G. Granquist, EDS., Optical Engineering Press, Wash. (1990), which are hereby incorporated by reference herein in their entireties. The thicknesses and materials of the coatings on the substrates of the electrochromic reflective element, such as on the third surface of the reflective element assembly, may be selected to provide a desired color or tint to the mirror reflective element, such as a blue colored reflector, such as is known in the art and/or such as described in U.S. Pat. Nos. 7,274,501; 5,910,854 and 6,420,036, and in PCT Application No. PCT/US03/29776, filed Sep. 9, 2003 by Donnelly Corp. et al. for MIRROR REFLECTIVE ELEMENT ASSEMBLY, which are all hereby incorporated herein by reference.

Optionally, use of an elemental semiconductor mirror, such as a silicon metal mirror, such as disclosed in U.S. Pat. Nos. 6,286,965; 6,196,688; 5,535,056; 5,751,489; and 6,065,840, and/or in U.S. patent application Ser. No. 10/993,302, filed Nov. 19, 2004 by Lynam for MIRROR REFLECTIVE ELEMENT FOR A VEHICLE, now U.S. Pat. No. 7,338,177, which are all hereby incorporated herein by reference in their entireties, can be advantageous because such elemental semiconductor mirrors (such as can be formed by depositing a thin film of silicon, such as a thin film of aluminum-doped silicon) can be greater than fifty percent reflecting in the photopic (SAE J964a measured), while being also substantially transmitting of light (up to twenty percent or even more). Such silicon mirrors also have the advantage of being able to be deposited onto a flat glass substrate and to be bent into a curved (such as a convex or aspheric) curvature, which is also advantageous since many passenger-side exterior rearview mirrors are bent or curved.

Optionally, the reflective element may include a perimeter metallic band, such as the types described in U.S. Pat. Nos. 7,274,501 and 7,184,190, and/or PCT Application No. PCT/US03/29776, filed Sep. 19, 2003 by Donnelly Corp. et al. for ELECTROCHROMIC MIRROR ASSEMBLY; and/or PCT Application No. PCT/US03/35381, filed Nov. 5, 2003 by Donnelly Corp. et al. for ELECTRO-OPTIC REFLECTIVE ELEMENT ASSEMBLY; and/or U.S. patent applications Ser. No. 11/021,065, filed Dec. 23, 2004 by McCabe et al. for ELECTRO-OPTIC MIRROR CELL, now U.S. Pat. No. 7,255,451; and/or Ser. No. 11/226,628, filed Sep. 14, 2005 by Karner et al. for MOUNTING ASSEMBLY FOR VEHICLE INTERIOR MIRROR; and/or U.S. provisional applications Ser. No. 60/692,113, filed Jun. 20, 2005; Ser. No. 60/677,990, filed May 5, 2005; Ser. No. 60/653,787, filed Feb. 17, 2005; Ser. No. 60/642,227, filed Jan. 7, 2005; Ser. No. 60/638,250, filed Dec. 21, 2004; Ser. No. 60/624,091, filed Nov. 1, 2004, and Ser. No. 60/609,642, filed Sep. 14, 2004, which are all hereby incorporated herein by reference. Optionally, the reflective element may include indicia formed at and viewable at the reflective element, such as by utilizing aspects of the reflective elements described in PCT Application No. PCT/US2006/018567, filed May 15, 2006; and U.S. provisional applications Ser. No. 60/681,250, filed May 16, 2005; Ser. No. 60/690,400, filed Jun. 14, 2005; Ser. No. 60/695,149, filed Jun. 29, 2005; Ser. No. 60/730,334, filed Oct. 26, 2005; Ser. No. 60/750,199, filed Dec. 14, 2005; Ser. No. 60/774,449, filed Feb. 17, 2006; and Ser. No. 60/783,496, filed Mar. 18, 2006, which are all hereby incorporated herein by reference in their entireties.

Optionally, the reflective element may comprise a single substrate with a reflective coating at its rear surface, without affecting the scope of the present invention. The mirror assembly thus may comprise a prismatic mirror assembly or planar or non-planar mirror or other mirror having a single substrate reflective element, such as a mirror assembly utilizing aspects described in U.S. Pat. Nos. 6,690,268; 5,668,663; 5,724,187; 6,318,870; 6,598,980; 5,327,288; 4,948,242; 4,826,289; 4,436,371; and 4,435,042; and PCT Application No. PCT/US04/015424, filed May 18, 2004 by Donnelly Corporation et al. for MIRROR ASSEMBLY FOR VEHICLE; and U.S. patent application Ser. No. 10/933,842, filed Sep. 3, 2004, now U.S. Pat. No. 7,249,860, which are hereby incorporated herein by reference in their entireties. Optionally, the reflective element may comprise a conventional prismatic or flat reflective element or prism, or may comprise a prismatic or flat reflective element of the types described in PCT Application No. PCT/US03/29776, filed Sep. 19, 2003 by Donnelly Corp. et al. for MIRROR REFLECTIVE ELEMENT ASSEMBLY; U.S. patent applications Ser. No. 10/709,434, filed May 5, 2004 by Lynam for MIRROR REFLECTIVE ELEMENT, now U.S. Pat. No. 7,420,756; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/933,842, filed Sep. 3, 2004 by Kulas et al. for INTERIOR REARVIEW MIRROR ASSEMBLY, now U.S. Pat. No. 7,249,860; Ser. No. 11/021,065, filed Dec. 23, 2004 by McCabe et al. for ELECTRO-OPTIC MIRROR CELL, now U.S. Pat. No. 7,255,451; and/or Ser. No. 10/993,302, filed Nov. 19, 2004 by Lynam for MIRROR REFLECTIVE ELEMENT FOR A VEHICLE, now U.S. Pat. No. 7,338,177, and/or PCT Application No. PCT/US2004/015424, filed May 18, 2004 by Donnelly Corp. et al. for MIRROR ASSEMBLY FOR VEHICLE, which are all hereby incorporated herein by reference in their entireties, without affecting the scope of the present invention.

Existing mirrors typically either have a sideward facing shell-mounted turn signal (that provide marginal point source light facing to the rear) or a rearward facing turn signal (that do not provide lighting to the front and sides of the vehicle). The conventional mirror assemblies thus do not provide front and side light while providing a "chevron" rear facing turn signal from the same light source element.

Figure 3:
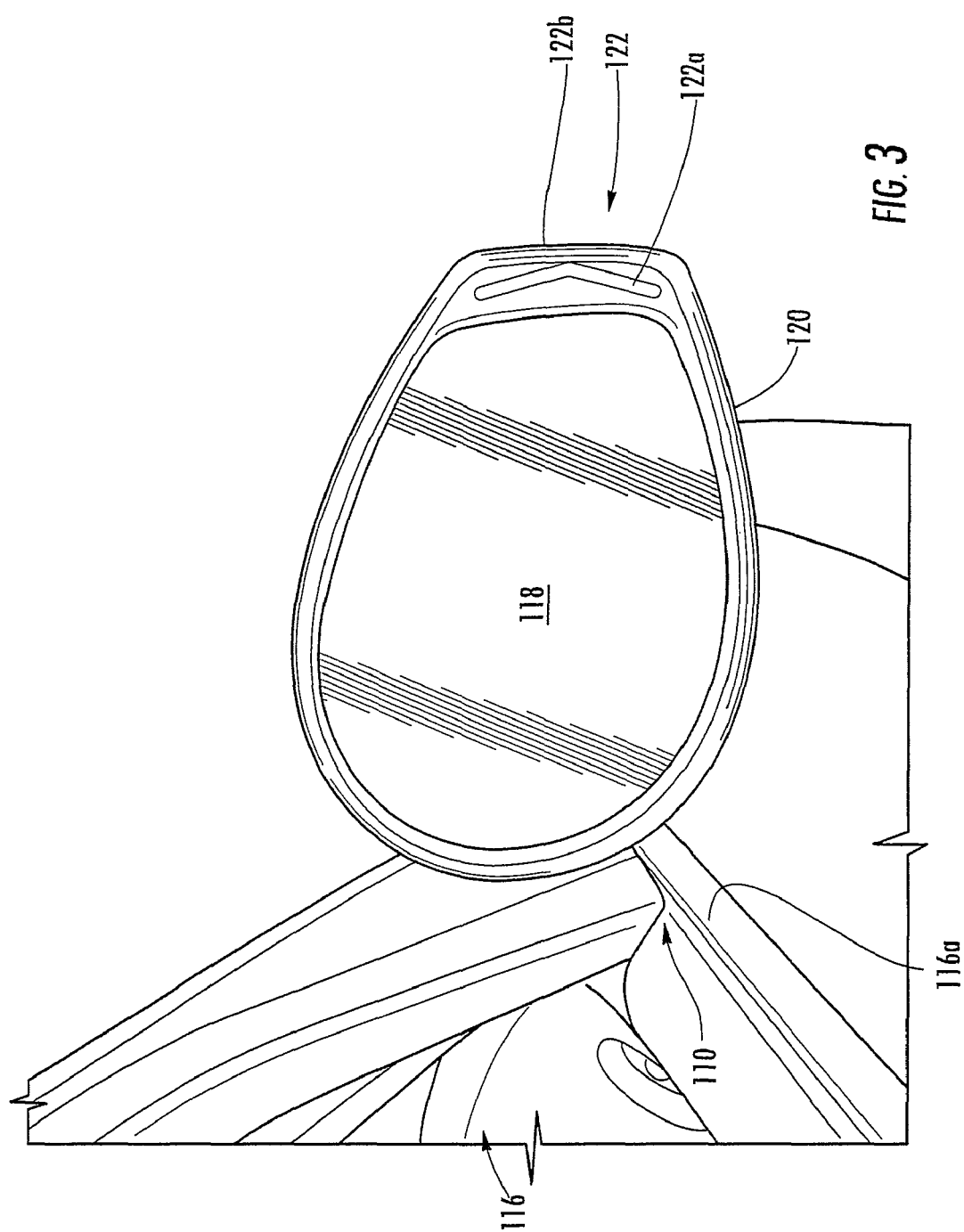
FIG. 3 is a view of an exterior mirror assembly with a turn signal indicator in accordance with the present invention, shown as viewed in the direction of travel of the vehicle.

Optionally, and with reference to FIG. 3, an exterior rearview mirror assembly 110 for a vehicle includes a reflective element 118 and a mirror shell or casing 120, and is mounted at the side 116a of a host or subject vehicle 116. Mirror assembly 110 includes a display element or device 122 that has a rearward facing indicator portion 122a disposed at an outboard and rearward lip of mirror casing 120, and a sideward/forward facing indicator portion 122b at an outer/forward portion of the mirror casing. Display element or device 122 includes an illumination source that is operable to provide a turn signal indicator or indication at the outboard lip of the mirror casing and at the sideward or forward portion of the mirror casing so as to be readily viewable by drivers of vehicles in the lane adjacent to the host vehicle. The "multi-directional" turn signal system of the present invention thus features a side facing turn signal that provides light to the front and sides, and has an integrated light source. The light source may be coupled to an light piping element, which may provide illumination to either or both of the rear facing "chevron" packaged to the rear outboard lip of the mirror casing and the side mounted or side facing indicator at the side or forward portion of the mirror casing.

The present invention thus may provide a turn signal solution that provides omni-directional lighting, such as toward the rear, front and side of the vehicle. In the illustrated embodiment, the indicator 122 comprises a chevron-shaped indicator (often a specific preference for some vehicle manufacturers, such as, for example, Toyota and GM) for viewing from the rear of the mirror assembly, while providing another indicator for viewing from the forward region (although not readily seen in FIG. 3, the mirror casing may include a lens or indicator portion 122b at a forward facing portion of the casing) so that illumination emanating from the illumination source that lights or illuminates the chevron-shaped indicator also lights or illuminates or backlights the forward facing lens. Because the turn signal indicator thus may utilize a common light source and electrical structure for providing both forward and rearward turn signal indication, the turn signal indicator of the present invention may be provided at a reduced price (since it may provide two turn signal indicators for about the price of one).

Further, by providing the turn signal indicator at the outboard lip of the mirror casing, the indicator or chevron design does not encroach on the rearward field of view of the driver of the vehicle, and thus may enhance the overall performance of the exterior rearview mirror assembly. Also, with many vehicle manufacturers trending toward global platforms, the turn signal indicator of the present invention allows for a "plug-and-play" design where the rear lip chevron (or other shaped indicator) could be included in many mirror assemblies, and readily omitted for export mirror assemblies that only require side facing turn signals. With the presently available commercialized indicators, European vehicle manufactures, for example, are often stuck with shell-mounted turn signals for the U.S. market, even though a chevron type rear facing turn signal is more preferred and relevant. Conversely, some of the large U.S. vehicle manufacturers have programs that have export versions that require the manufacturers to have to tool a shell-mounted sideward turn signal, as most prefer a rear facing turn signal for the domestic or U.S. market.

Optionally, if a through-the-glass blind spot or blind zone indicator is desired or selected for a particular mirror assembly (as is often preferred by some vehicle manufacturers), the present invention may provide "isolation" between the lip-mounted or located turn signal indicator or chevron and the blind zone indicator, so that the person viewing the mirror assembly may more readily recognize and discern the different indicators. The present invention thus provides a mirror turn signal system that is "multi-directional" and provides turn signal coverage to the front and side, and provides a rear facing "chevron" in the lip of the mirror housing in a single lighting package.

Optionally, it is envisioned that the outboard indicator (either at the lip of the mirror casing or sideward or forward portion of the mirror casing or elsewhere at the mirror casing or vehicle) may comprise a "transparent chrome" indicator that is selectively back lit by one or more illumination sources or light emitting diodes (LEDs). The use of LED lighting to execute a "transparent chrome" lighting is increasingly seen on concept vehicles. Such a lighting configuration may be provided by using a thick light pipe that blends in and looks "chromy" when not lit, but lights up to give a neon like look when activated or illuminated or back lit, such as when the turn signal of the vehicle is activated. Optionally, a clear polycarbonate (PC) lens may be formed to match the contours of the mirror assembly, and may be partially metallized to achieve the translucent functionality. Such a lens may then appear metallic when not illuminated, but lights up to give a neon like look when activated or illuminated or back lit, such as when the turn signal of the vehicle is activated.

Optionally, the mirror assembly may include multiple display elements or devices or signal indication modules (such as two or more display elements or devices or signal indication modules) for providing both an object in a blind spot/LCA indicator and display area and a turn signal indicator and display area. For example, one or more blind spot/LCA indicators and/or turn signal indicators may be established or disposed at the exterior rearview mirror (or elsewhere at the vehicle), such as by utilizing aspects of the indicators described in U.S. patent application Ser. No. 11/520,193, filed Sep. 13, 2006, now U.S. Pat. No. 7,581,859; and/or PCT Application No. PCT/US2006/018567, filed May 16, 2006 by Donnelly Corp. et al. for VEHICLE MIRROR ASSEMBLY WITH INDICIA AT REFLECTIVE ELEMENT; and/or PCT Application No. PCT/US2006/026148, filed Jul. 5, 2006; PCT Application No. PCT/US07/82099, filed Oct. 23, 2007; and/or U.S. provisional application Ser. No. 60/853,850, filed Oct. 24, 2006 by Lynam for DISPLAY DEVICE FOR EXTERIOR REARVIEW MIRROR, which are hereby incorporated herein by reference in their entireties.

Optionally, the reflective element may include an anti-reflection layer or layers disposed at the front surface of the front substrate of the reflective element to reduce reflection of light incident on the reflective element. The anti-reflection layer/layers may be deposited at the front surface of the front substrate during a pyrolytic deposition process. For example, the anti-reflection layer (such as an OPTIVIEW™ layer such as commercially available from Pilkington) may be deposited pyrolytically in a glass manufacturing plant where the anti-reflection layer may be formed by deposition onto the glass surface at the glass float-line itself when the glass ribbon is first being formed from the molten glass raw materials (where the red-hot molten glass exiting the glass furnace is floated onto a tin bath and where the coating materials or gasses or precursors are blown onto the red hot glass ribbon prior to it cooling to form the glass sheet, i.e., while the glass exits the tin bath and while it is still in a very hot condition to form the anti-reflection coatings on the glass surface by pyrolytic chemical reaction of the gaseous precursors as they are incident on the red-hot glass surface). It is envisioned that the conductive coating may also or otherwise be disposed or deposited at the surface of the glass via a pyrolytic deposition process, such as by utilizing aspects described in PCT Application No. PCT/US2006/018567, filed May 15, 2006; and/or PCT Application No. PCT/US07/82099, filed Oct. 23, 2007; and/or U.S. provisional application Ser. No. 60/853,850, filed Oct. 24, 2006 by Lynam for DISPLAY DEVICE FOR EXTERIOR REARVIEW MIRROR, which are hereby incorporated herein by reference in their entireties.

The mirror reflective element may be attached to a back plate or attachment plate, which may include an attachment element or elements (such as an annular ring or tab or annular prongs or annular snaps or the like) formed or established at the rear of the backing portion for attaching the back plate and reflective element for attaching the reflective element to a mirror actuator (such as a mirror actuator as known in the art and/or as described in U.S. Pat. Nos. 7,080,914; 7,073,914; 6,916,100; 6,755,544; 6,685,864; 6,467,920; 6,362,548; 6,243,218; 6,229,226; 6,213,612; 5,986,364 and 5,900,999, which are hereby incorporated herein by reference herein in their entireties), which is adjustable or operable to adjust a viewing angle of the mirror reflective element. When the mirror reflective element is canted or angled partially toward the driver of the host vehicle (which is typically the orientation of the reflective element during use so as to provide a generally rearward field of view to the driver of the host vehicle), there is sufficient space within the mirror casing at or near the outboard portion of the mirror assembly for the video display module. The back plate and video display module of the present invention thus utilizes the space within the mirror head or casing that is already available and typically not used or occupied by other components.

Optionally, a heater pad may be provided at the rear surface of the glass substrate of the reflective element and between the backing portion of the back plate and the reflective element to provide an anti-fogging of de-fogging feature to the exterior mirror assembly (such as by utilizing aspects of the heater elements or pads described in U.S. patent application Ser. No. 11/334,139, filed Jan. 18, 2006 by Byers et al. for MIRROR ASSEMBLY WITH HEATER ELEMENT, now U.S. Pat. No. 7,400,435, which is hereby incorporated herein by reference in its entirety). The back plate and/or heater pad may include suitable electrical connectors and connections incorporated therein (such as by utilizing aspects of the mirror assembly described in U.S. patent application Ser. No. 11/334,139, filed Jan. 18, 2006 by Byers et al. for MIRROR ASSEMBLY WITH HEATER ELEMENT, now U.S. Pat. No. 7,400,435, which is hereby incorporated herein by reference in its entirety) for electrically connecting the heater pad and/ or display element (or other suitable electrical connectors may be utilized, such as electrical leads or wire harnesses or pigtails or other separate connectors or cables or the like). The heater pad may include a hole or opening or aperture therethrough that generally corresponds to the display area of the video display module (and that generally corresponds to similar aperture through the back plate) when the heater pad is attached to the rear surface of the glass substrate and when the back plate is attached to the rear surface of the heater pad. Optionally, and desirably, the heater pad may include an adhesive layer (such as a pressure sensitive adhesive layer) at its rear surface for adhering the back plate to the heater pad and thus to the rear surface of the glass substrate of the reflective element. The back plate thus may be adhered to the heater pad such that the video display module is positioned or located generally at the aperture of the heater pad so as to be generally at the display area of the reflective element.

Optionally, and desirably, an opacifying element or layer or coating or film (such as black or dark color, such as dark blue or dark grey, paint or ink or film or coating or tape or lacquer or the like, and preferably a dark, light-absorbing layer that is printed or screened onto the fourth or rear surface of the electrochromic reflective element or cell) may be disposed between the heater element and the rear surface of the glass substrate. The dark or opacifying layer may be established via any suitable establishing methods or means, such as painting, printing, ink jet printing, pad printing, screening or the like.

Optionally, the back plate may include a perimeter framing portion or bezel portion that extends around the perimeter edges of the reflective element to support the reflective element and frame the reflective element at the mirror assembly (such as by utilizing aspects of the mirror assemblies described in U.S. patent application Ser. No. 11/520,193, filed Sep. 13, 2006, now U.S. Pat. No. 7,581,859, which is hereby incorporated herein by reference in its entirety). The perimeter bezel portion may be narrow or small depending on the particular application of the reflective element and mirror reflector sub-assembly. Optionally, the mirror reflector sub-assembly may comprise a bezeless or frameless reflective element (such as the types described in U.S. patent applications Ser. No. 11/226,628, filed Sep. 14, 2005; Ser. No. 10/533,762, filed May 4, 2005, now U.S. Pat. No. 7,184,190; and/or Ser. No. 11/021,065, filed Dec. 23, 2004, now U.S. Pat. No. 7,255,451, and/or PCT Application No. PCT/US2006/018567, filed May 15, 2006 by Donnelly Corp. et al., which are hereby incorporated herein by reference in their entireties), whereby the back plate may not include a perimeter framing portion or bezel portion around the perimeter of the reflective element.

Optionally, the mirror assembly may include one or more displays, such as the types disclosed in U.S. Pat. Nos. 5,530,240 and/or 6,329,925, which are hereby incorporated herein by reference, and/or display-on-demand or transflective type displays, such as the types disclosed in U.S. Pat. Nos. 6,690,268; 5,668,663 and/or 5,724,187, and/or in U.S. patent applications Ser. No. 10/054,633, filed Jan. 22, 2002 by Lynam et al. for VEHICULAR LIGHTING SYSTEM, now U.S. Pat. No. 7,195,381; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/538,724, filed Jun. 13, 2005 by Hutzel et al. for ACCESSORY SYSTEM FOR VEHICLE; Ser. No. 11/284,543, filed Nov. 22, 2005, now U.S. Pat. No. 7,370,983; and/or Ser. No. 11/021,065, filed Dec. 23, 2004 by McCabe et al, for ELECTRO-OPTIC MIRROR CELL, now U.S. Pat. No. 7,255,451; and/or PCT Application No. PCT/US03/29776, filed Sep. 9, 2003 by Donnelly Corp. et al. for MIRROR REFLECTIVE ELEMENT ASSEMBLY; and/or PCT Application No. PCT/US03/35381, filed Nov. 5, 2003 by Donnelly Corp. et al. for ELECTRO-OPTIC REFLECTIVE ELEMENT ASSEMBLY; and/or U.S. provisional applications Ser. No. 60/630,061, filed Nov. 22, 2004 by Lynam et al. for MIRROR ASSEMBLY WITH VIDEO DISPLAY; Ser. No. 60/667,048, filed Mar. 31, 2005 by Lynam et al. for MIRROR ASSEMBLY WITH VIDEO DISPLAY; Ser. No. 60/629,926, filed Nov. 22, 2004 by McCabe et al. for METHOD OF MANUFACTURING ELECTRO-OPTIC MIRROR CELL; Ser. No. 60/531,838, filed Dec. 23, 2003; Ser. No. 60/553,842, filed Mar. 17, 2004; and Ser. No. 60/563,342, filed Apr. 19, 2004, and/or PCT Application No. PCT/US03/40611, filed Dec. 19, 2003 by Donnelly Corp. et al. for ACCESSORY SYSTEM FOR VEHICLE, which are all hereby incorporated herein by reference in their entireties, or may include or incorporate video displays or the like, such as the types described in PCT Application No. PCT/US03/40611, filed Dec. 19, 2003 by Donnelly Corp. et al, for ACCESSORY SYSTEM FOR VEHICLE, and/or U.S. patent applications Ser. No. 10/538,724, filed Jun. 13, 2005; and/or Ser. No. 11/284,543, filed Nov. 22, 2005, now U.S. Pat. No. 7,370,983; and/or U.S. provisional applications Ser. No. 60/630,061, filed Nov. 22, 2004 by Lynam et al. for MIRROR ASSEMBLY WITH VIDEO DISPLAY; and Ser. No, 60/667,048, filed Mar. 31, 2005 by Lynam et al. for MIRROR ASSEMBLY WITH VIDEO DISPLAY, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A mirror reflective element sub-assembly for an exterior rearview mirror assembly of a vehicle, said mirror reflective element sub-assembly comprising:
   a mirror reflective element;
   a video display element, said video display element being disposed behind said mirror reflective element so that images displayed by said video display element are viewable through said mirror reflective element when said video display element is activated; and
   wherein said video display element is configured to display images that are readily viewable by the driver of the host vehicle and not readily viewable by drivers of other vehicles in the lane adjacent to the host vehicle.

2. The mirror reflective element sub-assembly of claim 1, wherein said video display element is operable to display other images that are readily viewable by drivers of other vehicles in the lane adjacent to the host vehicle and not readily viewable by the driver of the host vehicle.

3. The mirror reflective element sub-assembly of claim 1, wherein said mirror reflective element comprises a transflective mirror reflector.

4. The mirror reflective element sub-assembly of claim 1, wherein said video display element displays images responsive to operation of a function of the vehicle.

5. The mirror reflective element sub-assembly of claim 4, wherein said function of the vehicle comprises actuation by the driver of a turn signal of the vehicle.

6. The mirror reflective element sub-assembly of claim 4, wherein said function of the vehicle comprises a blind spot monitoring system of the vehicle.

7. The mirror reflective element sub-assembly of claim 4, wherein said video display element comprises a multi-viewing video screen.

8. The mirror reflective element sub-assembly of claim 7, wherein said multi-viewing video screen is operable to display a first video image for viewing by a person viewing said video screen from one angle and a second video image for viewing by a person viewing the display device from another angle.

9. The mirror reflective element sub-assembly of claim 4, including at least one of (a) light directing means to direct the displayed images in a desired direction and (b) at least one baffle to limit viewing of the displayed images from a direction other than a desired direction.

10. A mirror reflective element sub-assembly for a rearview mirror assembly of a vehicle, said mirror reflective element sub-assembly comprising:

a mirror reflective element;

a video display element, said video display element being disposed behind said mirror reflective element so that images displayed by said video display element are viewable through said mirror reflective element when said video display element is activated;

wherein said mirror reflective element comprises a transflective mirror reflector;

wherein said video display element displays responsive to operation of a function of the vehicle;

wherein said function of the vehicle comprises at least one of (a) actuation by the driver of a turn signal of the vehicle and (b) a blind spot monitoring system of the vehicle; and wherein said video display element comprises a multi-viewing video screen.

11. The mirror reflective element sub-assembly of claim 10, including at least one of (a) light directing means to direct the displayed images in a desired direction and (b) at least one baffle or to limit viewing of the displayed images from a direction other than a desired direction.

12. The mirror reflective element sub-assembly of claim 10, wherein said mirror reflective element sub-assembly comprises a mirror reflective element sub-assembly for an exterior rearview mirror assembly of a vehicle and wherein said video display element is configured to display images that are readily viewable by the driver of a host vehicle equipped with the exterior rearview mirror assembly and not readily viewable by drivers of other vehicles in the lane adjacent to the host vehicle.

13. The mirror reflective element sub-assembly of claim 12, wherein said video display element displays images representative of a sideward area at the side of the host vehicle and wherein said displayed images are displayed at the exterior side rearview mirror at the respective side of the vehicle, said video display element providing a cognizant association between the displayed images and the respective side region at which the scene represented by the captured images is occurring.

14. The mirror reflective element sub-assembly of claim 10, wherein said multi-viewing video screen is operable to display a first video image for viewing by a person viewing said video screen from one angle and a second video image for viewing by a person viewing the display device from another angle.

15. The mirror reflective element sub-assembly of claim 14, wherein said mirror reflective element sub-assembly comprises a mirror reflective element sub-assembly for an exterior rearview mirror assembly of a vehicle, and wherein said first video image comprises video images of the blind spot area for viewing by the driver of the host vehicle and substantially not viewable by drivers of other vehicles at the side or rear of the host vehicle, and wherein said second video image comprises video images indicative of a turn signal indicator for viewing by drivers of other vehicles at the side or rear of the host vehicle and substantially not viewable by the driver of the host vehicle.

\* \* \* \* \*

UNITED STATES PATENT AND TRADEMARK OFFICE
CERTIFICATE OF CORRECTION

| | | |
|---|---|---|
| PATENT NO. | : 7,777,611 B2 | |
| APPLICATION NO. | : 11/933697 | |
| DATED | : August 17, 2010 | |
| INVENTOR(S) | : Deval M. Desai | |

It is certified that error appears in the above-identified patent and that said Letters Patent is hereby corrected as shown below:

Column 4
Line 23, "fall" should be --full--

Column 5
Line 23, "7,339,149, filed May 11, 2005" should be
   --7,339,149; Ser. No. 10/534,632, filed May 11, 2005--
Line 38, "7,339,149, filed April 14, 2005" should be
   --7,339,149; Ser. No. 11/105,757, filed April 14, 2005--

Column 8
Line 36, "Kamer" should be --Karner--
Line 50, "Chrornogenics" should be --Chromogenics--

Column 11
Line 1, "platfonns" should be --platforms--

Signed and Sealed this
Twenty-second Day of November, 2011

David J. Kappos
*Director of the United States Patent and Trademark Office*